United States Patent [19]

Shiga et al.

[11] 4,254,237

[45] Mar. 3, 1981

[54] PROCESS FOR PRODUCING PROPYLENE-ETHYLENE BLOCK COPOLYMERS

[75] Inventors: Akinobu Shiga; Masahiro Kakugo; Hajime Sadatoshi; Kazuki Wakamatsu; Hiroshi Yoshioka, all of Niihama, Japan

[73] Assignee: Sumitomo Chemical Company, Limited, Osaka, Japan

[21] Appl. No.: 30,523

[22] Filed: Apr. 16, 1979

[30] Foreign Application Priority Data

Apr. 21, 1978 [JP] Japan .................................. 53-48128

[51] Int. Cl.³ .......................................... C08F 297/08
[52] U.S. Cl. .................................................. 525/323
[58] Field of Search ..................... 260/878 B; 525/323

[56] References Cited

U.S. PATENT DOCUMENTS

| | | | |
|---|---|---|---|
| 3,268,624 | 8/1966 | Jezl | 260/878 |
| 3,296,338 | 1/1967 | Jezl | 260/878 B |
| 3,442,978 | 5/1969 | Khelghatian | 260/878 B |
| 3,911,052 | 10/1975 | Castagna | 260/878 B |
| 3,974,237 | 8/1976 | Brumbaugh | 260/878 B |
| 4,066,718 | 1/1978 | Saito | 260/878 B |

FOREIGN PATENT DOCUMENTS

941087 11/1963 United Kingdom .
989724 4/1965 United Kingdom .

*Primary Examiner*—Paul R. Michl
*Attorney, Agent, or Firm*—Cushman, Darby & Cushman

[57] ABSTRACT

A process for producing propylene-ethylene block copolymers by a three-step polymerization technique using a stereoregular catalyst, characterized in that the first-step polymerization is carried out by supplying propylene alone or a propylene/ethylene mixture so that the ethylene/propylene reaction ratio is 6/94 or less, thereby polymerizing 60 to 95% by weight of the total polymerization amount, the second-step polymerization is carried out by supplying a propylene/ethylene mixture so that the ethylene/propylene reaction ratio is 15/85 to 79/21, thereby polymerizing 1 to 20% by weight of the total polymerization amount, and the third-step polymerization is carried out by supplying a propylene/ethylene mixture so that the ethylene/propylene reaction ratio is 50/50 to 89/11, thereby polymerizing 4 to 35% by weight of the total polymerization amount, with the ethylene/propylene reaction ratio in the third step made larger than that in the second step. Said process can give propylene-ethylene block copolymers markedly well balanced in impact strength, stiffness, transparency and impact blushing.

5 Claims, No Drawings

PROCESS FOR PRODUCING PROPYLENE-ETHYLENE BLOCK COPOLYMERS

The present invention relates to a process for producing propylene-ethylene block copolymers improved in properties, particularly, such as impact resistance, stiffness, transparency and impact blushing. Crystalline polyolefins have been produced on a commercial basis since a stereoregular catalyst was invented by Ziegler and Natta. Particularly, crystalline polypropylenes attract attention as a general-purpose resin having excellent stiffness and heat resistance.

Crystalline polypropylenes, however, have the drawback that they are brittle at low temperatures, so that they are not suitable for usages requiring impact resistance at low temperature. Many improvements have already been proposed as a result of extensive studies to overcome this drawback. Of these improvements, those disclosed in Japanese Patent Publication Nos. 14834/1963, 1836/1964 and 15535/1964 are particularly useful from the industrial point of view. They are a process including the block copolymerization of propylene and other olefins, particularly, ethylene.

But, block copolymers produced by these well-known methods also have drawbacks. For example, they are inferior to the crystalline polypropylenes in the stiffness and transparency of molded or fabricated products. Further, when the block copolymers are deformed by impact or bending, blushing appears at the deformed portion (referred to as "impact blushing" hereinafter), which leads to a remarkable reduction in commercial value.

In order to improve such drawbacks, there have been proposed many processes in which the block copolymerization is carried out in three steps. Specifically, Japanese Patent Publication No. 20621/1969 discloses an improvement in transparency, Japanese Patent Publication No. 24593/1974 an improvement in impact blushing and Japanese Patent Publication (unexamined) No. 25781/1973 an improvement in impact resistance.

In general, however, these properties, impact resistance, stiffness, transparency and impact blushing are in competition with one another, so that satisfactory, well-balanced polymers can not be obtained by these well-known processes.

The inventors extensively studied to overcome these difficulties, and found a process for obtaining polymers which are markedly well balanced in the physical and optical properties.

An object of the present invention is to provide a novel process for producing propylene-ethylene block copolymers which comprises carrying out polymerization in three steps using a stereoregular polymerization catalyst.

Another object of the present invention is to provide propylene-ethylene block copolymers markedly well-balanced in impact resistance, stiffness, transparency and impact blushing.

Other objects and advantages of the present invention will be appearant from the following descriptions.

According to the present invention, there is provided a polymerization process for producing propylene-ethylene block copolymers, by subjecting propylene and ethylene to a three-step polymerization using a stereoregular polymerization catalyst, characterized in that the first-step polymerization is carried out by supplying propylene alone or a propylene/ethylene mixture so that the ethylene/propylene reaction ratio {the molar ratio of ethylene to propylene which are taken into the copolymer (referred to as "ethylene/propylene reaction ratio" hereinafter} is 6/94 or less, preferably 4.5/95.5 or less, thereby polymerizing 60 to 95% by weight, preferably 65 to 93% by weight, of the total polymerization amount, the second-step polymerization is carried out by supplying a propylene/ethylene mixture so that the ethylene/propylene reaction ratio is 15/85 to 79/21, preferably 27/73 to 67/33, thereby polymerizing 1 to 20% by weight, preferably 2 to 15% by weight, of the total polymerization amount, and the third-step polymerization is carried out by supplying an ethylene/propylene mixture so that the ethylene/propylene reaction ratio is 50/50 to 89/11, preferably 76/24 to 88/12, thereby copolymerizing 4 to 35% by weight, preferably 6 to 30% by weight, of the total polymerization amount, with the ethylene/propylene reaction ratio in the third step made larger than that in the second step, most preferably with the polymerization amount in the second step made smaller than that in the third step.

The process of the present invention will be illustrated in detail hereinafter.

The propylene-ethylene block copolymerization of the present invention can be carried out in substantially the same manner as in the conventional polymerization for producing isotactic polypropylene using a stereoregular polymerization catalyst, except that said block copolymerization is divided into many steps and that attention needs to be given to the ethylene/propylene reaction ratios and polymerization amounts in the second and third steps.

Consequently, as the stereoregular polymerization catalyst used in the present invention, there are used the well-known catalysts consisting essentially of titanium trichloride, an organo-aluminum compound and optionally a stereoregularity-improving agent.

Herein, the titanium trichloride may include its composition.

As examples of the titanium trichloride there may be given, for example, titanium trichloride produced by the reduction of titanium tetrachloride with a metal or organometallic compound, or, further, the activation of the reduction product; products obtained by the pulverization of the foregoing substances; titanium trichloride obtained by the method disclosed in British Pat. No. 1391067; and titanium trichloride obtained by the methods disclosed in U.S. application Ser. No. 831,630.

The organo-aluminum compound includes for example dimethylaluminum chloride, diethylaluminum chloride, diisobutylaluminum chloride, diethylaluminum bromide and triethylaluminum. Of these compounds, diethylaluminum chloride is particularly preferred.

The stereoregularity-improving agent used as a third component of the catalyst includes for example the well-known compounds such as amines, ethers, esters, sulfur, halogen, benzene, azulene derivatives, organic or inorganic nitrogen compounds and organic or inorganic phosphorus compounds.

The polymerization of the present invention may be carried out in either of inert hydrocarbon or liquid propylene monomer in the substantial absence of an inert hydrocarbon. Further, it may be carried out in a gaseous phase. The polymerization temperature is not particularly limited, but generally, it is within a range of 20° to 90° C., preferably 40° to 80° C. The polymerization is carried out in the presence of the foregoing catalyst.

At the first step of the polymerization, propylene alone is polymerized, or a propylene/ethylene mixture is polymerized so that the ethylene/propylene reaction ratio is 6/94 or less, preferably 4.5/95.5 or less. In the case of the polymerization of propylene, polymers having the physical properties markedly well balanced can be obtained by carrying out the subsequent polymerization of the present invention. When improvements in transparency, impact blusing and impact strength are desired at a little sacrifice of stiffness if necessary, a small amount of ethylene is additionally added in the copolymerization.

In the copolymerization, propylene and a small amount of ethylene may be polymerized at the same time in a mixed state, or propylene alone may be first polymerized followed by copolymerization of a mixture of propylene and a small amount of ethylene. In either case, almost the same effect can be obtained.

When the ethylene/propylene reaction ratio exceeds the scope of the present invention, stiffness is extremely lowered.

In this polymerization step, preferably the well-known molecular weight-regulating agent such as hydrogen is added in order to regulate the melt processability of the polymer.

The second step of the polymerization follows the first step. In this step, copolymerization is carried out by supplying a propylene/ethylene mixture so that the ethylene/propylene reaction ratio is 15/85 to 79/21, preferably 27/73 to 67/33. The reaction ratio below 15/85 is not desirable because impact strength particularly at lowered temperatures characteristic of propylene-ethylene block copolymers becomes poor. The reaction ratio above 79/21 is not also desirable because impact strength becomes poor.

In this copolymerization step, a molecular weight-regulating agent is not particularly necessary.

The third step of the polymerization follows the second step. In this step, copolymerization is carried out by supplying an ethylene/propylene mixture so that the ethylene/propylene reaction ratio is 50/50 to 89/11, preferably 76/24 to 88/12. The reaction ratio below 50/50 is not desirable because stiffness, impact blushing and transparency become poor.

The reaction ratio above 89/11 is not also desirable because impact strength particularly at room temperature becomes poor depending upon the polymerization conditions at the second step. In this step, preferably, the well-known molecular weight-regulating agent such as hydrogen is added to regulate the melt processability of the copolymer.

It is preferred that the ethylene/propylene reaction ratio in the third step is larger than that in the second step, because the physical and optical properties of the copolymer is better balanced.

It is further preferred that the polymerization amount in the second step is smaller than that in the third step. When the polymerization amount in the second step is larger, transparency, stiffness and impact blushing become poor.

The three-step polymerization of the present invention may be carried out in a continuous way using three or more vessels, or in a batchwise way using one or more vessels, or in combination of the both.

Further, the three-step polymerization may be repeated several times.

The present invention will be illustrated more specifically with reference to the following examples and comparative examples which are not however to be interpreted as limiting the invention thereto.

The results of the examples are shown in Tables 1 to 6. The values of physical properites in the tables were measured by the following testing methods.

Melt index: ASTM D 1238-57T
Brittleness temperature: ASTM D 746
Stiffness: ASTM D 747-58T
Haze: ASTM D 1003 Test sample: Sheet (1 mm thick) molded by pressing.
Izod impact strength: ASTM D 256 Test temperature: 20° C., −20° C.
Impact blushing: Injection-molded sheet (1 mm thick) is placed at 20° C. on a Du Pont impact tester; the hemispherical tip (radius 6.3 mm) of the dart is contacted with the sheet; impact is given to the top of the dart with the 20 cm natural fall of a weight (1 kg); and the area of the blushed portion is measured.
Intrinsic viscosity (referred to as [$\eta$] for brevity): [$\eta$] is measured at 135° C. in tetralin.

These values were measured using test samples prepared as follows: The polymer particles obtained by the examples were mixed with the well-known additives such as an antioxidant, formed into pellets through an extruder and then pressed or injection-molded.

EXAMPLE 1

TiCl$_3$ AA (a product of Toho Titanium Co., Ltd.; 24 g), diethylaluminum chloride (144 g) and heptane (100 liters) were charged in a 250-liter autoclave with a stirrer. The first step of the polymerization was advanced by supplying propylene while maintaining the polymerization temperature at 70° C. and the polymerization pressure at 9 kg/cm$^2$G in the presence of hydrogen. The supply of propylene was stopped when the polymerization amount reached 29.4 kg, and the unreacted monomer was immediately purged. The polymer in the autocalve was sampled in a small amount and measured for [$\eta$].

The second step of the polymerization was advanced by supplying ethylene and propylene while maintaining the polymerization temperature at 60° C. and the polymerization pressure at 2.5 kg/cm$^2$G in the substantial absence of hydrogen. The supply of ethylene and propylene was stopped when the polymerization amount reached 3.1 kg, and the unreacted monomers were immediately purged. During this polymerization period, the ethylene concentration of the gaseous phase in the autoclave was 14 to 19 mole %, and its mean value was 16 mole %. A small amount of the polymer was sampled and measured for [$\eta$].

The third step of the polymerization was advanced by supplying ethylene and propylene while maintaining the polymerization temperature at 60° C. and the polymerization pressure at 2.7 kg/cm$^2$G in the presence of hydrogen. The supply of ethylene and propylene was stopped when the polymerization amount reached 8.4 kg, and the unreacted monomers were immediately purged. During this polymerization period, the ethylene concentration of the gaseous phase in the autoclave was 59 to 70 mole %, and its mean value was 65 mole %.

n-Butanol was added to the resulting polymer slurry to decompose the catalyst, and the slurry was filtered and dried to obtain a white, powdery polymer.

The ethylene/propylene reaction ratio in the second and third steps were calculated from the material balance. The calculated values and the polymerization results are shown in Table 1. The physical and optical properties of the polymer obtained are shown in Table 2.

Further, the ethylene/propylene reaction ratios were obtained using the well-known infrared absorption spectra, and it was found that the values obtained were almost the same as those obtained from the material balance (this is also the same in the following examples and comparative examples).

Next, Comparative example 1 will be shown in order to demonstrate that the propylene/ethylene block copolymer obtained by the method of Example 1 is markedly well balanced in the physical and optical properties as compared with polymers obtained by the well-known two-step block copolymerization technique.

In Comparative example 1, the second-step polymerization and third step one in Example 1 were combined into one step.

COMPARATIVE EXAMPLE 1

In completely the same manner as in Example 1, TiCl$_3$ AA (a product of Toho Titanium Co., Ltd.; 24 g), diethyl aluminum chloride (144 g) and heptane (100 liters) were charged in a 250-liter autoclave with a stirrer, followed by the first-step polymerization. The supply of propylene was stopped when the polymerization amount reached 29.4 kg, and the unreacted monomer was immediately purged. A small amount of the polymer was sampled and measured for [$\eta$].

At the second step, polymerization was advanced by supplying ethylene and propylene while maintaining the polymerization temperature at 60° C. and the polymerization pressure at 3.5 kg/cm$^2$G in the presence of hydrogen. When the polymerization amount reached 11.5 kg, the unreacted monomers were immediately purged. During this polymerization period, the ethylene concentration of the gaseous phase in the autoclave was 40 to 45 mole %, and its mean value was 42 mole %.

The resulting polymer slurry was treated in the same manner as in Example 1 to obtain a white, powdery polymer.

The ethylene/propylene reaction ratio in the second step was calculated from the material balance. The calculated values and the polymerization results are shown in Table 1, and the physical and optical properties of the polymer obtained are shown in Table 2. The followings are known from Tables 1 and 2: As compared with the well-known two-step polymerization technique, the process of the present invention produces the polymer which is superior in haze and impact blushing and markedly well balanced in the physical and optical properties.

TABLE 1

|  | First step | Second step | | Third step | |
|---|---|---|---|---|---|
|  | [$\eta$] dl/g | [$\eta$] dl/g | Ethylene/propylene reaction ratio molar ratio | [$\eta$] dl/g | Ethylene/propylene reaction ratio molar ratio |
| Example 1 | 1.65 | 2.19 | 44/55 | 4.26 | 84/16 |
| Comparative example 1 | 1.63 | 4.08 | 72/25 | | |

TABLE 2

|  | Melt index g/10 min | Brittleness temperature °C. | Stiffness kg/cm$^2$ | Haze % | Izod impact strength | | Impact blushing | |
|---|---|---|---|---|---|---|---|---|
|  |  |  |  |  | 20° C. | −20° C. | 20 cm | 50 cm |
|  |  |  |  |  | kg · cm/cm$^2$ | | cm$^2$ | |
| Example 1 | 2.3 | −32 | 10300 | 79 | 12 | 5.8 | 1.6 | 2.9 |
| Comparative example 1 | 2.7 | −33 | 9500 | 96 | 12 | 4.9 | 2.4 | 4.8 |

EXAMPLE 2

(1) Synthesis of catalyst

Catalyst preparation 1

Atmosphere in a 500-cc reactor was replaced with argon, and heptane (80 cc) and titanium tetrachloride (20 cc) were added thereto. Thereafter, a solution comprising heptane (100 cc) and ethylaluminum sesquichloride (41.2 cc) was added dropwise thereto over 3 hours with stirring while maintaining the temperature of the reaction system at −10° C.

After the addition was finished, the temperature was raised to 95° C. over 35 minutes, followed by stirring for further 2 hours. After allowing to stand still, the reduction product was separated from the liquid portion and washed with heptane (100 cc) four times.

Catalyst preparation 2

The reduction product obtained by Catalyst preparation 1 in Example 2 was suspended in toluene (250 cc), and iodine and di-n-butyl ether were added thereto so that the molar ratios of the both to titanium trichloride in the reduction product were 0.1 and 1.0, respectively. Reaction was then carried out at 95° C. for 1 hour.

After the reaction was finished, the supernatant liquor was removed, and the residue was washed with toluene (30 cc) three times and then with heptane (30 cc) two times. The residue was then dried to obtain 28.0 g of titanium trichloride solid catalyst (I).

(2) Propylene-ethylene block copolymerization

After a 200-liter autoclave with a stirrer was evacuated, propylene was charged under pressure to 300 mmHg (gauge pressure), and then the pressure in the autoclave was reduced to −500 mmHg (gauge pressure). This operation was repeated three times.

Thereafter, the titanium trichloride solid catalyst (I) (2.6 g) and diethylaluminum chloride (51 g) were charged in the autoclave.

The first step of the polymerization was advanced by supplying liquid propylene (51 kg) and maintaining the polymerization temperature at 70° C. in the presence of hydrogen. When the polymerization amount reached 24.6 kg, the unreacted monomer was purged.

At the second step, polymerization was advanced in a gaseous phase by supplying ethylene and propylene while maintaining the polymerization temperature at 70° C. and the polymerization pressure at 10 kg/cm$^2$G in the absence of hydrogen. When the polymerization amount reached 2.9 kg, the unreacted monomers were purged. During this polymerization period, the mean ethylene concentration of the gaseous phase in the autoclave was 10 mole %.

At the third step, polymerization was advanced in a gaseous phase by supplying ethylene and propylene while maintaining the polymerization temperature at 60° C. and the polymerization pressure at 4.5 kg/cm²G in the presence of hydrogen. When the polymerization amount reached 8.7 kg, the unreacted monomers were purged. During this polymerization period, the mean ethylene concentration of the gaseous phase in the autoclave was 69 mole %. At the end of each polymerization step, a small amount of the polymer was sampled and measured for $[\eta]$.

The polymer obtained was transferred to a 200-liter autoclave with a stirrer, and after adding propylene oxide (180 g), the polymer was stirred at 60° C. for 30 minutes to make the catalyst residue in the polymer harmless. The polymer was then dried to obtain a white, powdery polymer.

The polymerization results are shown in Table 3, and the physical and optical properties of the polymer are shown in Table 4.

Next, Comparative example 2 will be shown in order to demonstrate that, when block copolymerization is carried out by the well-known three-step polymerization technique, the polymer obtained is ill balanced in the physical and optical properties as compared with the polymer obtained by the process of the present invention.

merization step, a small amount of the polymer was sampled and measured for $[\eta]$.

The polymer thus obtained was treated in the same manner as in Example 2 to obtain a white, powdery polymer. The polymerization results are shown in Table 3, and the physical and optical properties of the polymer are shown in Table 4.

It is apparent from Table 4 that the polymer obtained by the process of the present invention is superior in haze, stiffness and impact blushing and markedly well balanced in physical and optical properties as compared with the polymer obtained by the well-known three-step polymerization technique in Comparative example 2.

TABLE 3

|  | First step | Second step | | Third step | |
|---|---|---|---|---|---|
|  |  | Ethylene/propylene reaction | | Ethylene/propylene reaction | |
|  | $[\eta]$ dl/g | $[\eta]$ dl/g | ratio molar ratio | $[\eta]$ dl/g | ratio molar ratio |
| Example 2 | 1.60 | 2.23 | 28/72 | 4.24 | 87/13 |
| Comparative example 2 | 1.79 | 1.80 | 4.2/95.8 | 3.60 | 68/32 |

TABLE 4

|  | Melt index g/10 min | Brittleness temperature °C. | Stiffness kg/cm² | Haze % | Izod impact strength | | Impact blushing | |
|---|---|---|---|---|---|---|---|---|
|  |  |  |  |  | 20° C. | −20° C. | 20 cm | 50 cm |
|  |  |  |  |  | kg · cm/cm² | | cm² | |
| Example 2 | 0.9 | −35 | 9100 | 84 | 22 | 6.3 | 1.2 | 1.8 |
| Comparative example 2 | 1.9 | −42 | 8400 | 97 | 15 | 6.4 | 2.1 | 3.3 |

COMPARATIVE EXAMPLE 2

In the same manner as in Example 2, the catalyst comprising the solid catalyst (I) and diethylaluminum chloride, and then liquid propylene were charged in a 200-liter autoclave with a stirrer, followed by first-step polymerization in the presence of hydrogen. When the polymerization amount reached 15.8 kg, the unreacted monomer was purged.

At the second step, polymerization was advanced in a gaseous phase by supplying ethylene and propylene while maintaining the polymerization temperature at 70° C. and the polymerization pressure at 20 kg/cm² G in the presence of hydrogen. When the polymerization amount reached 9.0 kg, the unreacted monomers were purged.

At the third step, polymerization was advanced in a gaseous phase by supplying ethylene and propylene while maintaining the polymerization temperature at 60° C. and the polymerization pressure at 4.5 kg/cm²G in the presence of hydrogen. When the polymerization amount reached 8.3 kg, unreacted monomers were purged.

The mean ethylene concentrations of the gaseous phases in the second and third steps were 1.2 mole % and 38 mole %, respectively. At the end of each poly-

EXAMPLE 3

After a 200-liter autoclave with a stirrer was evacuated, propylene was charged under pressure to 300 mmHg (gauge pressure), and then the pressure in the autoclave was reduced to −500 mmHg (gauge pressure). This operation was repeated three times. Thereafter, the titanium trichloride solid catalyst (I) (2.5 g) and diethylaluminum chloride (100 g) was charged in the autoclave.

The first step of the polymerization was advanced by supplying liquid propylene (51 kg) and maintaining the polymerization temperature at 70° C. in the presence of hydrogen. When the polymerization amount reached 27.3 kg, the unreacted monomer was purged.

At the second step, polymerization was advanced in a gaseous phase by supplying ethylene and propylene while maintaining the polymerization temperature at 60° C. and the polymerization pressure at 10 kg/cm²G in the presence of hydrogen. When the polymerization amount reached 1.7 kg, the unreated monomers were purged. During this polymerization period, the mean ethylene concentration of the gaseous phase in the autoclave was 22 mole %.

At the third step, polymerization was advanced in a gaseous phase by supplying ethylene and propylene while maintaining the polymerization temperature at 70° C. and the polymerization pressure at 5 kg/cm²G in the presence of hydrogen. When the polymerization amount reached 5.5 kg, the unreacted monomers were purged. During this polymerization period, the mean ethylene concentration of the gaseous phase in the autoclave was 71 mole %.

At the end of each polymerization step, a small amount of the polymer was sampled and measured for [η].

The polymer obtained was transferred to a 200-liter autoclave with a stirrer, and after adding propylene oxide (180 g), the polymer was stirred at 60° C. for 30 minutes to make the catalyst residue in the polymer harmless. The polymer was then dried to obtain a white, powdery polymer.

The polymerization results are shown in Table 5, and the physical properties of the polymer are shown in Table 6.

TABLE 5

|  | First step | Second step | | Third step | |
|---|---|---|---|---|---|
|  | [η] dl/g | [η] dl/g | Ethylene/ propylene reaction ratio molar ratio | [η] dl/g | Ethylene/ propylene reaction ratio molar ratio |
| Example 3 | 1.63 | 2.09 | 49/51 | 3.33 | 88/12 |
| Comparative example 3 | 1.60 | 1.63 | 5.9/94.1 | 3.25 | 77/23 |

TABLE 6

|  | Melt index g/10 min | Brittleness temperature °C. | Stiffness kg/cm$^2$ | Haze % | Izod impact strength | | Impact blushing | |
|---|---|---|---|---|---|---|---|---|
|  |  |  |  |  | 20° C. | −20° C. | 20 cm | 50 cm |
|  |  |  |  |  | kg · cm$^2$ | | cm$^2$ | |
| Example 3 | 3.9 | −38 | 11300 | 72 | 9.7 | 3.9 | 1.5 | 2.9 |
| Comparative example 3 | 2.4 | −24 | 7600 | 91 | 11 | 4.0 | 1.9 | 3.1 |

Next, Comparative example 3 will be shown in order to demonstrate that, when block copolymerization is carried out by the well-known three-step polymerization technique, the polymer obtained are ill balanced in the physical and optical properties as compared with the polymer obtained by the process of the present invention.

COMPARATIVE EXAMPLE 3

The three-step polymerization was carried out in the same manner as in Example 3 except that the polymerization conditions were changed as follows:
First step:
  Polymerization temperature: 70° C.
  Polymerization amount: 16.2 kg
Second step:
  Polymerization temperature: 60° C.
  Polymerization pressure: 1 kg/cm$^2$G
  Polymerization amount: 8.5 kg
  Mean ethylene concentration of gaseous phase: 1.6 mole %
Third step:
  Polymerization temperature: 70° C.
  Polymerization pressure: 10 kg/cm$^2$G
  Polymerization amount: 7.0 kg
  Mean ethylene concentration of gaseous phase: 50 mole %

The polymer obtained was treated in the same manner as in Example 3.

The polymerization results are shown in Table 5, and the physical and optical properties of the polymer are shown in Table 6. It is apparent from Table 6 that the polymer obtained by the process of the present invention is superior in stiffness and haze and markedly well balanced in physical and optical properties as compared with the polymer obtained by the well-known three-step polymerization technique in Comparative example 3.

We claim:

1. A process for producing a propylene-ethylene block copolymer by subjecting propylene and ethylene to three-step polymerization using a stereoregular polymerization catalyst, characterized in that the first-step polymerization is carried out by supplying propylene alone or a propylene/ethylene mixture so that the ethylene/propylene reaction ratio is 6/94 or less, thereby polymerizing 60 to 95% by weight of the total polymerization amount, the second-step polymerization is carried out by supplying a propylene/ethylene mixture so that the ethylene/propylene reaction ratio is 27/63 to 67/33, thereby polymerizing 1 to 20% by weight of the total polymerization amount, and the third-step polymerization is carried out by supplying a propylene/ethylene mixture so that the ethylene/propylene reaction ratio is 76/24 to 89/11, thereby polymerizing 4 to 35% by weight of the total polymerization amount, with the ethylene/propylene reaction ratio in the third step made larger than that in the second step.

2. A process according to claim 1, wherein the first-step polymerization is carried out by supplying propylene alone or a propylene/ethylene mixture so that the ethylene/propylene reaction ratio is 4.5/95.5 or less, thereby polymerizing 65 to 93% by weight of the total polymerization amount, the second-step polymerization is carried out by polymerizing 2 to 15% by weight of the total polymerization amount, and the third-step polymerization is carried out by polymerizing 6 to 30% by weight of the total polymerization amount.

3. A process according to claim 1 or 2, wherein the polymerization amount in the second step is less than that in the third step.

4. A process according to claim 1 or 2, wherein hydrogen as a molecular-weight regulating agent is added to the polymerization system in the first and third steps.

5. A propylene-ethylene block copolymer produced by the method of claim 1.

* * * * *